United States Patent
Cassel et al.

(10) Patent No.: US 9,850,741 B2
(45) Date of Patent: *Dec. 26, 2017

(54) INTERCHANGEABLE ORIFICE PLATE WELLHEAD SYSTEM

(71) Applicant: Landtec North America, Inc., Colton, CA (US)

(72) Inventors: Mitchal Cassel, Redlands, CA (US); Jamie Tooley, Beaumont, CA (US); Scott Marcell, Banning, CA (US)

(73) Assignee: Landtec North America, Inc., Colton, CA (US)

( * ) Notice: Subject to any disclaimer, the term of this patent is extended or adjusted under 35 U.S.C. 154(b) by 139 days.

This patent is subject to a terminal disclaimer.

(21) Appl. No.: 14/734,640

(22) Filed: Jun. 9, 2015

(65) Prior Publication Data

US 2016/0123108 A1   May 5, 2016

Related U.S. Application Data

(63) Continuation of application No. 14/329,118, filed on Jul. 11, 2014, now Pat. No. 9,062,510.

(60) Provisional application No. 62/014,938, filed on Jun. 20, 2014.

(51) Int. Cl.
*E21B 34/02* (2006.01)
*F16K 37/00* (2006.01)

(52) U.S. Cl.
CPC .......... *E21B 34/02* (2013.01); *F16K 37/0008* (2013.01)

(58) Field of Classification Search
CPC ............................. E21B 34/02; F16K 37/0008
See application file for complete search history.

(56) References Cited

U.S. PATENT DOCUMENTS

| | | | | |
|---|---|---|---|---|
| 1,631,264 A | * | 6/1927 | Haldeman | G01F 1/42 138/44 |
| 1,662,374 A | * | 3/1928 | Woodmansee | F16K 3/30 138/44 |
| 1,731,404 A | * | 10/1929 | Wetherill | G01F 1/42 138/44 |
| 1,822,961 A | * | 9/1931 | Emery | G01F 1/42 137/315.01 |
| 1,953,110 A | * | 4/1934 | Holtane | E21B 43/12 138/44 |
| 2,007,036 A | * | 7/1935 | Cornell | G01F 1/42 138/44 |
| 2,088,968 A | * | 8/1937 | Muff | F16K 3/312 138/44 |
| 2,252,337 A | * | 8/1941 | Worthen | G01F 1/42 138/44 |
| 2,661,768 A | * | 12/1953 | Novak | F16L 1/11 138/44 |

(Continued)

*Primary Examiner* — Blake Michener
(74) *Attorney, Agent, or Firm* — Kinney & Lange, P.A.

(57) ABSTRACT

An interchangeable orifice wellhead system is disclosed which comprises a flow control valve comprised of a male union, a female union, a valve cap, and an orifice plate. The orifice plate can include a display tab, which visually communicates to the technician the size of orifice plate aperture. Orifice plates having different size apertures can be interchanged within the same flow control valve. In some embodiments, the male union of the flow control valve can be machined or interchanged with another male union to be used with different size orifice plates.

5 Claims, 6 Drawing Sheets

(56) References Cited

U.S. PATENT DOCUMENTS

| | | | | |
|---|---|---|---|---|
| 2,707,489 A * | 5/1955 | Larkin | ............... | E21B 49/087 |
| | | | | 138/45 |
| 3,126,917 A * | 3/1964 | Hodgeman | ........... | F16L 55/027 |
| | | | | 138/44 |
| 4,750,370 A * | 6/1988 | Ossyra | .................. | G01F 1/42 |
| | | | | 73/861.61 |
| 7,497,772 B2 * | 3/2009 | Laib | ................. | F16L 41/082 |
| | | | | 138/44 |
| 8,025,080 B2 * | 9/2011 | Orleskie | ............ | G01F 1/42 |
| | | | | 138/44 |
| 8,365,765 B2 * | 2/2013 | Bell | ..................... | G01F 1/42 |
| | | | | 137/551 |
| 2006/0231149 A1 * | 10/2006 | Kulkarni | ............ | G01F 1/42 |
| | | | | 138/44 |
| 2012/0261601 A1 * | 10/2012 | Colby | .................. | F16K 1/54 |
| | | | | 251/264 |
| 2013/0180703 A1 * | 7/2013 | Colby | ................. | E21B 41/00 |
| | | | | 166/75.13 |

* cited by examiner

INTERCHANGEABLE ORIFICE PLATE WELLHEAD SYSTEM

CROSS-REFERENCE TO RELATED APPLICATIONS

This application is a continuation of U.S. patent application Ser. No. 14/329,118, entitled "Interchangeable Orifice Plate Wellhead System," filed on Jul. 11, 2014, which claims the benefit of U.S. Provisional Patent Application No. 62/014,938, entitled "Orifice Plate Wellheads," filed on Jun. 20, 2014. The disclosure of the foregoing application is hereby incorporated by reference in its entirety.

BACKGROUND

The present technology relates to orifice plate wellhead systems and, in particular, orifice plate wellhead systems configured to easily determine and/or adjust the flow rate of fluid.

Most landfill gas is produced by biodegradation, which occurs when organic waste is broken down by bacteria naturally present in the waste and in the soil used to cover the landfill. Landfill gas is mostly made of methane, carbon dioxide, and trace amount of a wide variety of volatile organic compounds.

Landfill gases can contribute to ozone formation, atmospheric photochemical reaction, and other types of air pollution. Landfill gases can also create dangerous conditions. For example, if methane is present in the air at higher concentrations, it can be explosive. Landfill gases may also contribute to water pollution if it migrates and comes in contact with groundwater. Therefore, it is desirable to collect landfill gas to prevent these dangers. Collected landfill gases can be used as a source of power generation, or be incinerated before being released into the atmosphere.

Active landfill gas well extraction systems are used to collect landfill gases. Such systems are commonly made of an array of pipes and valves in fluid communication with a vacuum source. Active landfill gas well extraction systems also include wellhead assemblies, which are used to monitor and control the amount of gas passing through the pipes. A wellhead assembly can include flow rate measurement sensors and a flow rate control feature, which are used to determine and control the gas extraction rate.

One of the important considerations in using a gas well extraction system is to precisely control the gas flow rate. Under-extraction rates mean the extraction rate is not high enough to prevent gas from reaching the surface or prevent subsurface migration. This may result in air pollution or a fire hazard. Over-extraction rates mean the extraction rate is high enough to draw large amounts of air into the waste column. This may kill many of the microorganisms, resulting in reduced methane recovery. Thus, the gas flow rate needs to be carefully monitored and controlled within a narrow operating range to prevent over- or under-extraction of landfill gas.

SUMMARY

The systems, methods and devices described herein have innovative aspects, no single one of which is indispensable or solely responsible for their desirable attributes. Without limiting the scope of the claims, some of the advantageous features will now be summarized.

One aspect of the present invention is the realization that existing gas valves do not provide the capability for a technician to accurately determine and finely tune the flow rate of gas through the wellhead systems in the field. Thus, there exists a need for a wellhead system which allows for accurate determination and tuning of gas flow rate in the field. Described herein are various implementations of orifice plates that may be used for course adjustment of flow rates of a wellhead's gas flow rate, or even fine adjustment of flow rates in some embodiments. In some embodiments, another flow rate mechanism, such as the needle valve described in U.S. Pat. No. 8,678,348, titled "GAS FLOW CONTROL VALVE," issued Mar. 25, 2014, may be used in conjunction with the flow rate control mechanisms discussed herein. The above-noted patent is hereby incorporated by reference in its entirety and for all purposes.

In one embodiment, a flow control valve comprises a male union comprising a male threaded portion and a central aperture configured to allow gas flow within the central aperture, a valve cap member comprising a female threaded portion configured to receive and threadedly engage with the male threaded portion of the male union, and an orifice plate configured for positioning between the male union and the valve cap member, such that the orifice plate is securely engaged between the male union and the valve cap member when threadedly engaged, the orifice plate including a substantially circular plate having an orifice in a central portion of the substantially circular plate, the orifice plate further including a tab portion extending substantially orthogonal to a plane of the substantially circular plate, the tab portion including a visual indication of a size of the orifice in the central portion of the substantially circular plate. In one embodiment, the male threaded portion includes a size indication slot extending across all of threads of the male threaded portion along less than twenty percent of an outer circumference of the male union, the size indication slot sized to allow at least a portion of the tab portion of the orifice plate to be enclosed between threads of the female threaded portion and the size indication slot of the male threaded portion.

The flow control valve may comprise a female union comprising a central aperture configured to allow gas flow within the central aperture. The orifice plate may be securely engaged between the male union and the female union. The flow control valve may further comprise a sealing means for sealing a space between the male union and the valve cap member. The flow control valve may further comprise a sealing means for sealing a space between the male union and the female union. The sealing means may be an o-ring. The sealing means may further comprise the valve cap member. The flow control valve may comprise a top surface having a recessed ledge configured to receive the orifice plate therein. The recessed ledge may further comprise an o-ring groove, the o-ring groove being shaped and sized to fit an o-ring. The orifice plates may have different size orifices that can be interchanged within said recessed ledge. The tab portion of the orifice plate may have widths of between about 0.3 and 1.5 inches. The orifice plate may have an orifice diameter of between about 0.3 and 3.0 inches.

In one embodiment, a retrofit kit for a flow control valve in a wellhead system comprises a plurality of interchangeable orifice plates each including a substantially circular plate having an orifice in a central portion of the substantially circular plate and a tab portion extending substantially orthogonal to a plane of the substantially circular plate, the tab portion including a visual indication of a size of the orifice in the central portion of the circular plate. In one embodiment, at least two of the interchangeable orifice plates have orifices of different sizes. In one embodiment, the retrofit kit further includes a male union comprising a male threaded portion, a top planar surface, and a central aperture configured to allow gas flow within the central aperture, the top planar surface of the mail union including a recessed ledge shaped and sized to allow the interchangeable orifice plates to be removably mounted to the orifice plate recess, the male union further comprising a size indication slot extending across all threads of the male threaded portion along less than twenty percent of an outer circumference of the male union, the size indication slot sized configured to allow at least a portion of the tab portion of the orifice plate to be enclosed between threads of the female threaded portion and the size indication slot of the male threaded portion, wherein the male union is configured to replace a widely used male union of existing landfill flow control valves.

BRIEF DESCRIPTION OF THE DRAWINGS

The above-mentioned aspects, as well as other features, aspects, and advantages of the present technology will now be described in connection with various embodiments, with reference to the accompanying drawings. The illustrated embodiments, however, are merely examples and are not intended to be limiting. Like reference numbers and designations in the various drawings indicate like elements.

DETAILED DESCRIPTION

In the following detailed description, reference is made to the accompanying drawings, which form a part of the present disclosure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, illustrated in the figures, can be arranged, substituted, combined, and designed in a wide variety of different configurations, all of which are explicitly contemplated and form part of this disclosure. For example, a system or device may be implemented or a method may be practiced using any number of the aspects set forth herein. In addition, such a system or device may be implemented or such a method may be practiced using other structure, functionality, or structure and functionality in addition to or other than one or more of the aspects set forth herein. Alterations in further modifications of the inventive features illustrated herein, and additional applications of the principles of the inventions as illustrated herein, which would occur to one skilled in the relevant art in possession of this disclosure, are to be considered within the scope of the invention.

Descriptions of the necessary parts or elements may be omitted for clarity, and like reference numerals refer to like elements throughout. In the drawings, the size and thickness of layers and regions may be exaggerated for clarity and convenience.

Embodiments described herein generally relate to systems, devices, and methods related to orifice plate wellhead systems. More specifically, some embodiments relate to orifice wellhead systems configured to easily determine and/or adjust the flow rate of fluid, such as gas. When used herein, flow rate is used in reference to the volumetric flow rate passing through the flow control valve.

Figure 1:
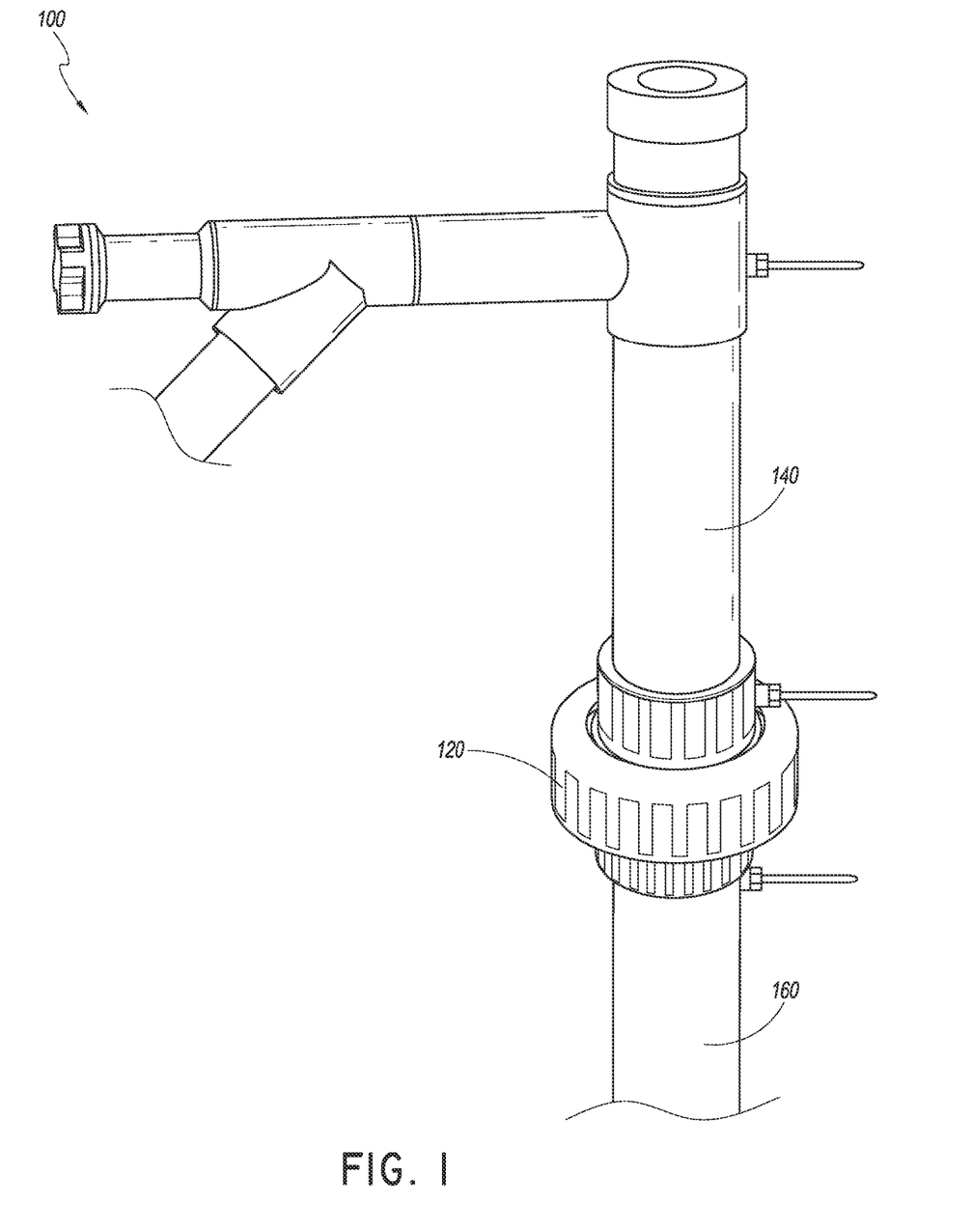
FIG. 1 is an isometric drawing of an exemplary wellhead system.

FIG. 1 is an isometric view of one embodiment of an orifice wellhead system 100. As noted above, an operating goal of landfills is to remove gas at the approximate rate of its generation. Therefore, in some embodiments, the orifice wellhead system 100 can comprise a flow control valve 120 as illustrated in FIG. 1. The orifice wellhead system 100 can include an upper pipe 140, a lower pipe 160, and the flow control valve 120. In some embodiments, gas may be extracted from the landfill and flow through the lower pipe 160 past the flow control valve 120 to reach the upper pipe 140. Often, the flow control valve 120 can allow a technician to adjust the rate of gas flowing through the valve and thus the rate of gas extraction. The flow control valve 120 is configured to accurately set the flow rate of gas flowing through the flow control valve 120, especially when the desired rate of extraction and, thus the desired flow rate through the flow control valve 120 is low and/or when a precise flow rate and/or a small adjustment to the current flow rate of the wellhead are necessary.

Figure 2:
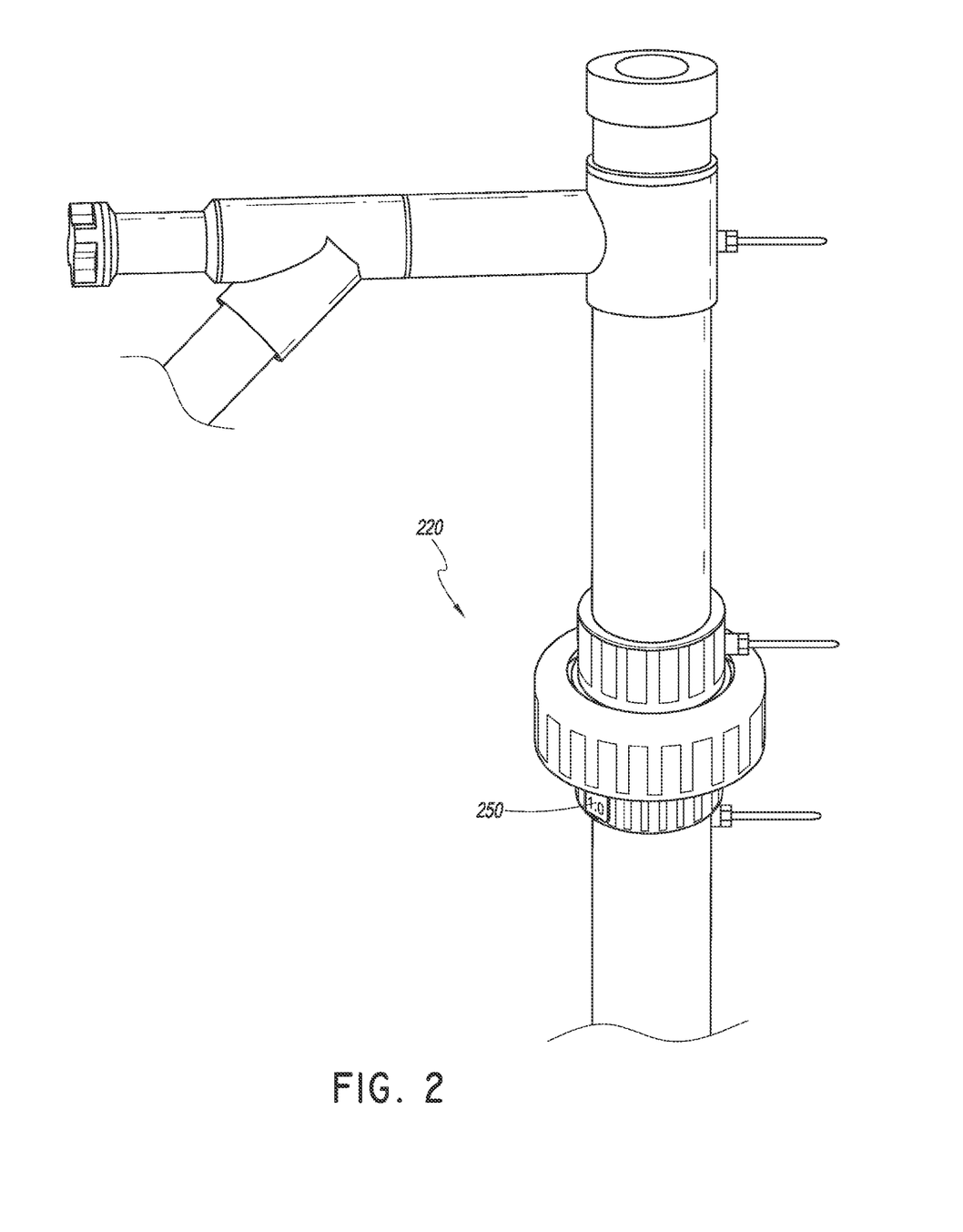
FIG. 2 is an isometric drawing of a wellhead system including a flow control valve with an orifice plate having a display tab.

FIG. 2 is an isometric drawing of a wellhead including a flow control valve 220 that includes an orifice plate with a display tab 250. The term "valve," as well as other terms used herein, should be construed to include the provided definitions, the ordinary and customary meaning of the terms, and/or any other implied meaning for the respective terms. The valve 220, for example, may also be referred to as a housing for orifice plates or an orifice plate retaining assembly. Accordingly, use of "valve" herein is simply for ease of description and does not limit the scope of the term to external uses/definitions of the term.

In some embodiments, the flow control valve 220 includes a display tab 250 (that is part of an interchangeable orifice plate, as described further below) that visually communicates to the technician a setting of the flow control valve 220, such as a diameter of an aperture in the particular orifice plate currently included in the flow control valve 220. In the example of FIG. 2, for example, an aperture size of "1.0" is indicated on the display tab 250, which in this example indicates that an orifice within the flow control valve 220 has a diameter of 1 inches. In other embodiments, the orifice size indicator may be in a different format, such as a letter, color, symbol, etc. representing a size of orifice. By using a display tab 250 a technician is able to more accurately determine a current flow rate and determine when and which adjustment are to be made. As necessary, the technician may adjust gas flow through the wellhead by adjusting the orifice plate included within the flow control valve 220 to achieve a new, desired flow setting (which will then be displayed external to the flow control valve 220 on a display tab 250 of a replacement orifice plate).

Figure 3:
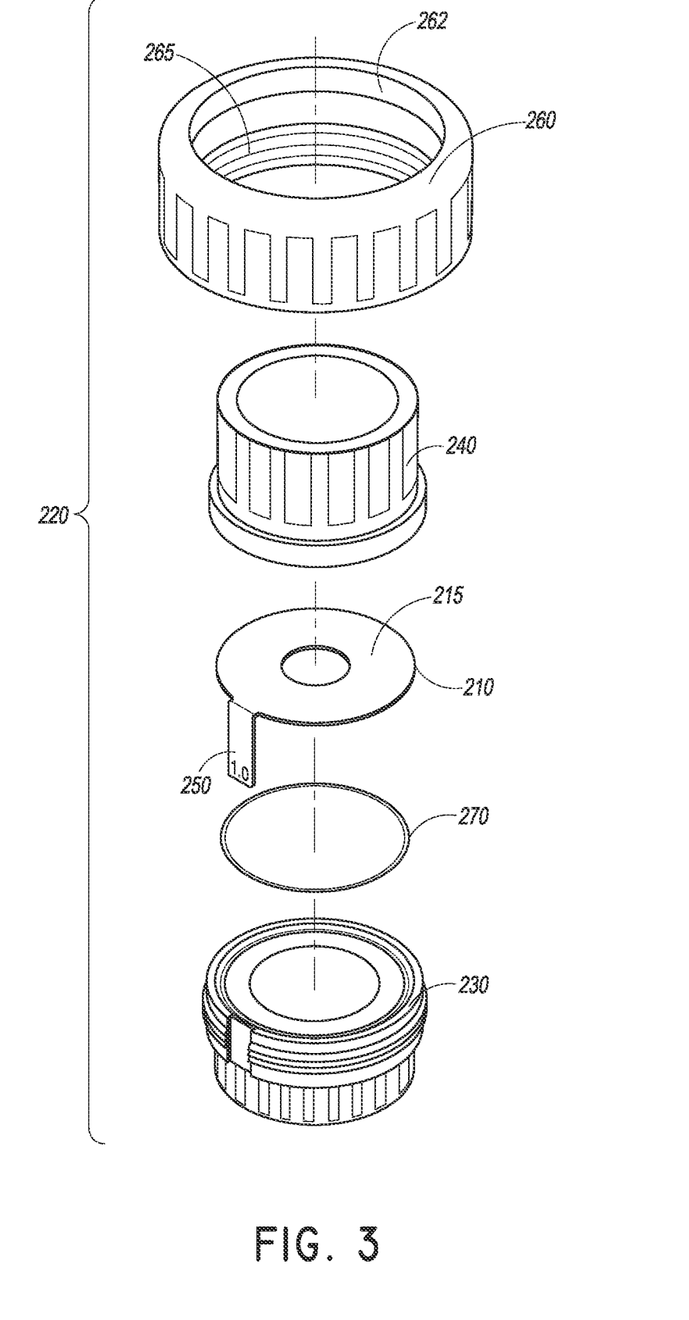
FIG. 3 illustrates an exploded view of the flow control valve shown in FIG. 2.
Figure 4:
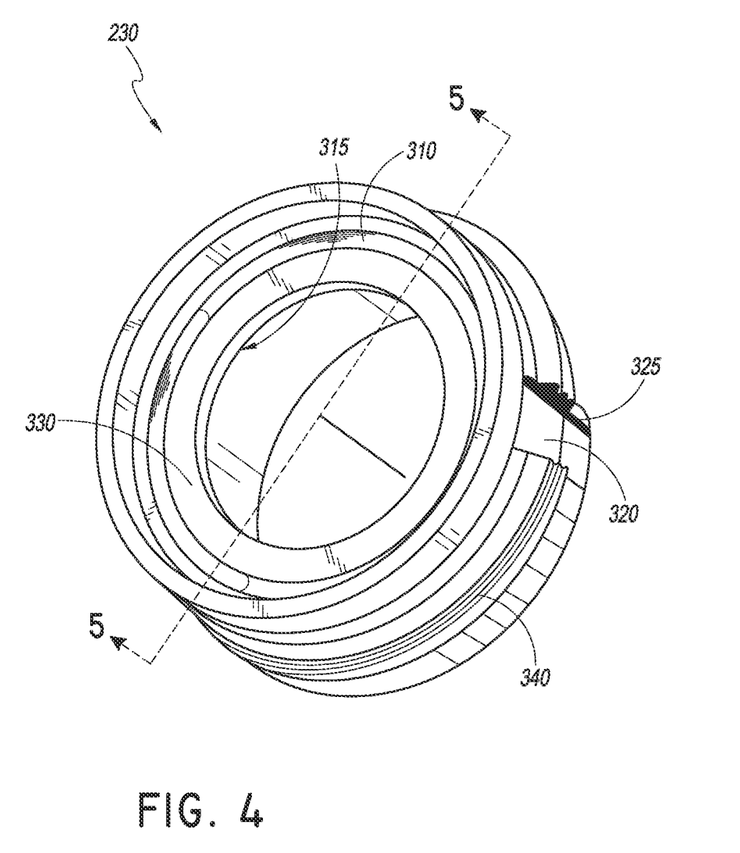
FIG. 4 illustrates a perspective view of one embodiment of a male union.

FIG. 3 illustrates an exploded view of the flow control valve shown 220 in FIG. 2, and FIG. 4 illustrates a perspective view of one embodiment of the male union 230 (of FIGS. 2-3) that includes a size indication slot 320 (e.g., that is machined into an existing male union and/or is included in an originally molded male union) that is sized to contain the display tab 250 of an orifice plate 210. In the example of FIG. 3, the flow control valve 120 includes a tabbed orifice plate 210, an o-ring 270, a male union 230, a female union 240, and a valve cap member 260. As shown in FIG. 3, each of the parts comprising the flow control valve 220 can be joined together axially.

FIGS. 6A to 6D illustrate additional tabbed orifice plates 210A, 210B, 210C, and 210D having various aperture sizes. In this example, the tabbed orifice plates 510 are washer-shaped plates having an outer diameter 510 and an orifice (also referred to herein as an "aperture") 520. As shown, each of the tabbed orifice plates 210 includes a display tab 250 (250A, 250B, 250C, and 250D, respectively). The display tab 250 can be a flat rectangular plate extending substantially orthogonal from a planar surface of the orifice plate 210, on or near the outer diameter 510 of the orifice plate 210. In some embodiments, the display tab 250 can extend substantially orthogonal from a rectangular plate on the planar surface 215 (FIG. 3) of the orifice plate 210, away from the outer diameter 510 of the orifice plate 210.

Returning to FIG. 3, the illustrated o-ring 270 is a ring-shaped band made of an elastomer. The female union 240 can be substantially cylindrical in shape, having a central aperture. The male union 230 can be substantially cylindrical in shape configured to couple with the female union 240 (e.g. by receiving the female union 240 within the perimeter wall 335 as described below with reference to FIG. 5). The male union 230 can have central aperture. Central apertures of the male and female unions 230, 240 are configured to allow gas flow within the central aperture.

The valve cap member 260 can be substantially cylindrical in shape having an internal cylindrical bore. The internal cylindrical bore of the valve cap member 260 can have a greater circumference than the circumference of the male union 230 and the female union 240, which allows the male union 230 and the female union 240 to slip-fit into the internal bore of the valve cap member 260. The valve cap member 260 can include a top latching portion 262 and a valve cap threaded portion 265. The valve cap threaded portion 265 can be internal threads on the inner circumferential surface of the valve cap member 260 generally on the bottom half of the valve cap member 260. The orifice plate 210 can be axially positioned between the male union 230 and the female union 240, with the display tab 250 extending towards the male union 230. The o-ring 270 can be axially positioned between the male union 230 and the orifice plate 210.

Parts of the flow control valve 220 described above in reference to FIG. 3 can be positioned differently along the axis. For example, in some embodiments, the male union 230 is axially positioned above the female union 240. In some embodiments, the display tab 250 can extend towards the female union 240. In some embodiments, the valve cap member 260 can threadingly mate with the female union 240. In some embodiments, the valve cap member 260 and female union 240 may be combined into a single component. Other configurations with different combinations, separations, and/or positionings of parts are possible, and such configurations are within the scope of this disclosure.

Figure 5:
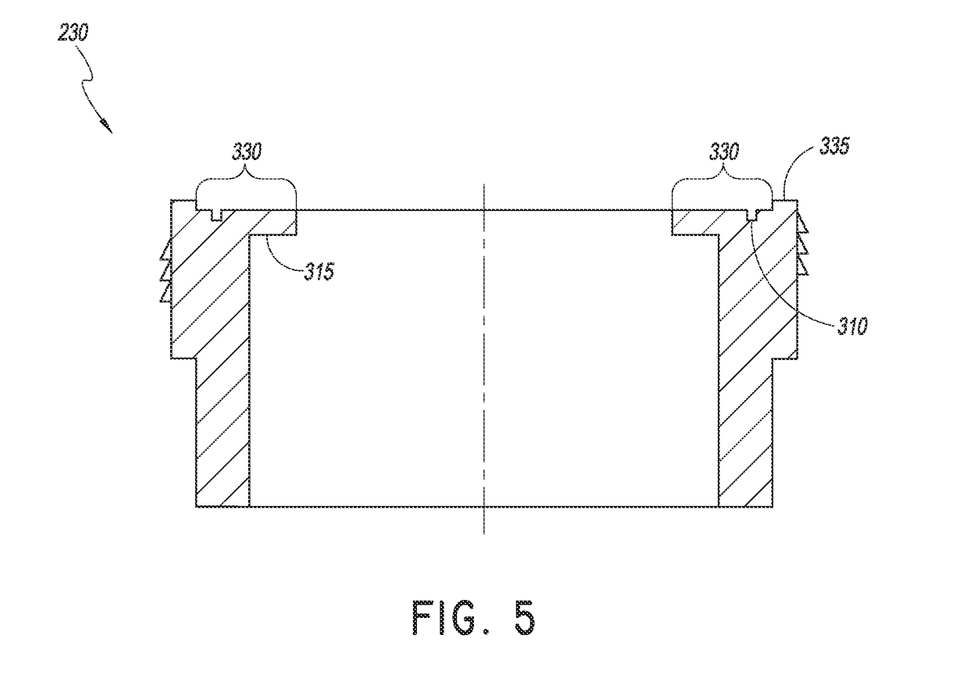
FIG. 5 illustrates a cross-section view of one embodiment of a male union.
Figures 6A, 6B, 6C, 6D:
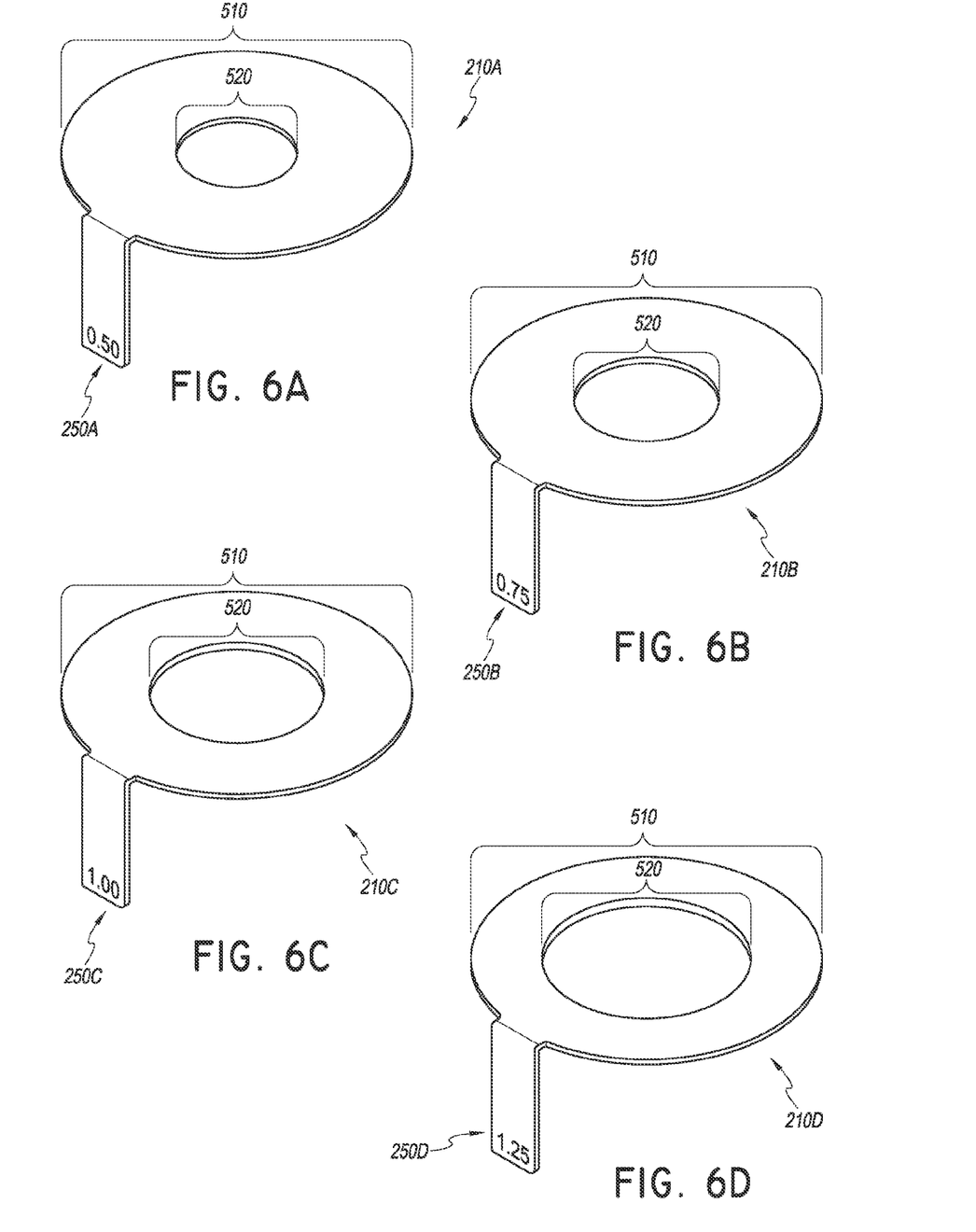
FIGS. 6A to 6D illustrate example orifice plates having various apertures.

Referring to FIGS. 4 and 5 (FIG. 5 is a cross-section of the male union 230 taken across section 5-5 indicated in FIG. 4), the male union 230 can include a male union threaded portion 340, a top surface portion 315, and a size indication slot 320. The threaded portion 340 can be external threads on the outer circumferential surface of the male union 230. The threaded portion 340 can be generally on the top half of the male union, and comprises the outermost circumference of the male union. The top surface portion 315 can be a ring-shaped surface portion perpendicular to the axial direction of the male union, formed by a slight reduction of diameter on the top edge of the male union. The size indication slot 320 can be a rectangular cutout on the threaded portion 340 extending across all of threads of the male threaded portion, shaped and sized to fit the display tab 250 of the orifice plate 210. The size indication slot 320 can extend along less than twenty percent of a circumference of the male union. In one embodiment, the size indication slot 320 extends along a circumference of the male union a distance that is substantially equivalent to a width of the display tab 250. For example, if the display tab 250 width is 0.53 in, the size indication slot 320 may be slightly larger than 0.53 in (e.g., 0.54 in) such that the size indication slot 320 secures the display tab 250 within the size indication slot 320. In some embodiments, the size indication slot 320 can cut into the male union threaded portion 340 with a depth that is deeper than the thickness of the display tab 250. For example, the size indication slot 320 can have a depth of between about 0.06 in to about 0.1 in.

The valve cap member 260 can be axially positioned above the female union 240 and threadingly mate with the male union 230. For example, the valve cap member 260 can mate with the male union 230 by screwing the valve cap member 260 onto the male union 230, by threadingly mating the valve cap threaded portion 265 with the male union threaded portion 340. In some embodiments, the height of the valve cap member in the axial direction can be shorter than the height of the male union 230 and the female union 240. For example, as shown in FIG. 2, parts of the male union 230 and the female union 240 are exposed and not covered by the valve cap member 260. The axial length of the display tab 250 can be similar to the axial height of the male union 230, such that a portion of the display tab 250 is visible when the valve cap member 260 is mated to the male union 230. In some embodiments, as shown in FIGS. 1 and 2, the top latching portion 262 of the valve cap member 260 can latch onto a portion of the female union member 240, while the valve cap member 260 threading mates with the male union 230, thereby securing the female union 240 with the male union 230. By securing the female union 240 and the male union 230, the space between the male and female unions can be tightened and sealed.

Visible Tab

In some embodiments, a display tab 250 may allow a technician to confirm the aperture reading from the outside of the flow control valve 120 during the operation of the orifice wellhead system 100. An unobstructed view of the tab can allow the technician to view the aperture reading without having to manually adjust any features, such as a valve sealing cap. Sometimes a technician may need to connect and operate a gas flow sensor to orifice wellhead systems in order to determine gas flow rates within a pipe. With a display tab 250 visible from the outside, the technician may read the aperture and connect the sensor to pressure ports on the wellhead system and determine the gas flow rate immediately, without having to unscrew, remove or adjust any obstructing features.

In some embodiments, a valve cap member can be used on a flow control valve 220. The valve cap member 260 may cover only a portion of the display tab 250, such that a portion of the display tab 250 showing the aperture 520 of the orifice plate 210 remains visible even after the valve cap 260 is screwed in on the male union 230. A technician can confirm the reading on the display tab 250, unscrew the valve cap member 260, and replace the orifice plate 210 with another orifice plate having a different aperture (such as the example orifice plates 210A-210D illustrated in FIG. 6). The valve cap member 260 can serve both to connect the male and female unions 230, 240, and to tighten and seal the space between the male and female union with the orifice plate 210 in between. With the valve cap member 260 serving to both connect and tighten the unions 230, 240, a technician does not have to operate separate tightening features such as a pipe tightening collar, or a separate valve sealing cap in addition to a tightening feature.

Fixed Orifice Plate Orientation

In some embodiments, a display tab 250 can latch onto a size indication slot 320, such that the display tab 250 prevents any rotational movement of the orifice plate 210. By having the display tab 250 latch onto the size indication slot 320 on the male union, the display tab 250 can be placed inside an outermost circumference of the male union (the outermost circumference can be the circumference of the threaded portion of the male union). A display tab 250 that latches onto the size indication slot 320 can position the display tab 250 at a fixed orientation. Sometimes an orifice plate 210 may bend, rotate, tilt, or bend during operation of the orifice wellhead system 100 due to shaking, vibration or other external impacts. Latching the display tab 250 onto the size indication slot 320 can help affix the orifice plate 210 and reduce displacement of the plate 210. By having a fixed orientation, a technician can expect the display tab 250 to be visible from a set location, such as at a location where a technician stands to operate the orifice wellhead system 100, a pressure sensor, pipe adjustment tools, etc.

In some embodiments, a substantially circular orifice plate 210 can be used. The circular shape of the orifice plate 210 may allow the orifice plate to be encased within the circumference of the valve unions 230, 240, valve cap 260, and/or the pipes. Being encased can mean that no part of planar surface of the orifice plate 215 is exposed outside of the flow control valve 120, such that the orifice plate 210 is not bent, twisted, or manipulated by external impact.

In some embodiments, the display tab 250 is connected to the orifice plate 210 on or near the outer circumference of the orifice plate 210, such that no part of the orifice plate 210 extends beyond the circumference of the male union 230. This configuration can allow the valve cap member 260 to be placed over the orifice plate 210, to completely encase the orifice plate 210.

Sealing

In some embodiments, the valve 120 may be sealed, while minimizing the amount of vacant space between the valve and the valve cap member 260. A more complete sealing is achieved by minimizing the amount of vacant space inside the valve cap member 260. Leakage of gas due to poor sealing can compromise the accuracy of the gas flow control determination. For a more complete sealing, a mechanical seal such as an o-ring 270 can be used between the orifice plate 210 and the male and the female unions 230, 240. The o-ring 270 can be made of an elastomer that can be compressed from its original expanded state. As the space between the male union and the female union 230, 240 is tightened, the o-ring 270 can be compressed to seal off gas passage. The mechanical seal made of an elastomer, in addition to sealing the space between the male and the female unions 230, 240, can grip the orifice plate 210 in place and prevent its displacement by exerting a frictional force onto the place and the union members.

As shown in FIG. 5, the male union member 230 can provide a groove 310 for the o-ring, such that the o-ring can be placed in a pre-set location. A precise placement of the o-ring 270 can prevent the o-ring 270 from being displaced, when the orifice plate 210 is being replaced. The o-ring 270 can remain in the groove 310 and not slide out as the technician takes the orifice plate 210 off of the male union 230. A precise placement of the o-ring 270 can also help ensure that the o-ring is properly placed to seal off the gas passage, rather than being placed off-centered or in any other location or orientation that can compromise its sealing capability.

Retrofitting

As noted above, FIG. 5 illustrates a cut-out view of an embodiment of a male union 320. In this example, the top surface portion 315 of the male union includes an orifice plate recess 330 and an o-ring groove 310. The orifice plate recess 330 can be a recess on the top surface 315 made by forming a perimeter wall 335 to surround the orifice plate 210. The perimeter wall 335 can be sized to allow an orifice plate 210 to fit within an inner circumference of the perimeter wall 335 such that the orifice plate 210 is supported by the orifice plate recess 330 and an o-ring 270 placed in the o-ring groove 310. The perimeter wall 335 can be sized to allow an orifice plate 210 to be supported by the orifice plate recess 330. The perimeter wall 335 can be sized to allow the circumference of the female union 240 to fit within an inner circumference of the perimeter wall 335. As shown, the o-ring groove 310 can be a cut-out on the top surface portion 315 shaped and sized to fit the o-ring 270. In some embodiments, as shown in FIGS. 4 and 5, the o-ring groove 310 can be a circular cut-out on the orifice plate recess 330.

In some embodiments, an existing flow control valve may be easily replaced (retrofitted) with the valve 220 configured for supporting a tabbed orifice plate 210 (discussed further below). For example, the valve 120 in FIG. 1 may include an orifice plate, but there is no externally visible indication of whether there is an orifice plate in the valve 120 and, if so, what size the orifice is. Thus, the valve 120 may be updated and/or changed without significant reworking of the valve 120 or wellhead. For example, a retrofitting process may require only that the male union is machined (e.g., to create the size indication slot 320 for the tabbed orifice plate 210, the orifice place recess 330, and/or the o-ring groove 310) without other adjustments to the pre-existing flow control valve 120 and well head. Accordingly, such a retrofit may be performed without introducing extraneous features, such as a valve collar or a handle used to tighten the upper pipe 140 and the lower pipe 160, or a valve system having one or more side outlets. Such extraneous features can also require existing pipes to be replaced in order to introduce said features.

In some embodiments, multiple orifice plates of different sizes can be used with unions of different threads, with machining of only the male portion 260. For example, the male union 260 can be machined with a grinding machine, a planer, a lathe, a shaper, etc. to fit orifice plates 210 of different sizes. In some embodiments, the male union 230 can be molded and/or manufactured to fit the orifice plates (e.g., including a size indication slot, an orifice plate recess, and/or an o-ring groove), such that an originally plastic molded male union may be usable with the orifice plates discussed herein. To retrofit an existing valve, either one of these processes could be used to replace or modify a male union with the size indication slot (and orifice plate recess and/or o-ring groove, depending on the embodiment). Thus, in some embodiments a technician may take out an existing union installed in the flow control valve 120, 220 and adjust, manipulate, or machine only a male union to fit in an orifice plate 210. In other embodiments, the size indication slot may be part of the female union, such that similar aftermarket and/or manufacturing changes to the female union may be made in order to allow placement of an orifice plate with a display tab as disclosed herein within a size indication slot of a female union and/or valve cap member.

As noted above, FIGS. 6A to 6D illustrate example orifice plates having various apertures. Orifice plates 210 having various apertures can be used on the flow control valve 220. A technician can replace an orifice plate 210 currently included in a flow control valve with another orifice plate having a different aperture 520. For example, an orifice plate 210A having a smaller aperture 520A in FIG. 6A can be replaced with an orifice plate 210B having a larger aperture 520B. In some embodiments, orifice plate apertures 520 can have different shapes. For example, an orifice plate can have a meshed aperture, a slatted aperture, an aperture having a polygon shape, etc. Orifice size indications on the tabs 250 may be in different units (e.g., inches or millimeter), or may be representative of sizes of the orifices (e.g., the indications may be whole numbers from 1-6, which indicate orifice sizes of 0.75 in, 1.0 in, 1.25 in, 1.5 in, 1.75 in, and 2.0 in, respectively; thus, the technician may more easily determine a relative orifice size and replace with one that is larger or smaller, as needed, based on these simplified representations of the orifice sizes). As noted above, orifice sizes may vary from one implementation to another. Similarly, kits of orifice plates may include varying quantities of orifice plates having varying ranges of orifice sizes. For example, a first orifice plate kit may include eight orifice plates having orifice sizes ranging from 0.4 in to 2.1 in, while a second orifice plate kit may include four orifice plates having orifice sizes ranging from 1 in to 2 in.

What is claimed is:

1. A retrofit kit for a flow control valve in a wellhead system comprising:
    a plurality of interchangeable orifice plates each including
        a substantially circular plate having an orifice in a central portion of the substantially circular plate; and
        a tab portion extending substantially orthogonal to a plane of the substantially circular plate, the tab portion including a visual indication of a size of the orifice in the central portion of the circular plate,
    wherein at least two of the interchangeable orifice plates have orifices of different sizes; and,
    a male union comprising a male threaded portion, a top planar surface, and a central aperture configured to allow gas flow within the central aperture, the top planar surface of the male union including a recessed ledge shaped and sized to allow the interchangeable orifice plates to be removably mounted to the orifice plate recess, the male union further comprising a size indication slot extending across all threads of the male threaded portion along less than twenty percent of an outer circumference of the male union, the size indication slot sized configured to allow at least a portion of the tab portion of the orifice plate to be enclosed between threads of the female threaded portion and the size indication slot of the male threaded portion;
        wherein the male union is configured to replace a widely used male union of existing landfill flow control valves.

2. The retrofit kit of claim 1, wherein the tab portion of the orifice plates has a width of about 0.5 inches.

3. The retrofit kit of claim 2, wherein the retrofit kit further comprises a sealing means for sealing a space between the male union and the interchangeable orifice plates.

4. The retrofit kit of claim 3, wherein the sealing means is an o-ring.

5. The retrofit kit of claim 4, wherein the top planar surface of the male union includes shaped and sized to fit the o-ring.

* * * * *